June 29, 1937.　　　　R. R. BOYLES　　　　2,085,074
HYDRANT AND DEFORMABLE OR BREAKABLE VALVE STEM THEREFOR
Filed May 13, 1935　　　　2 Sheets-Sheet 2
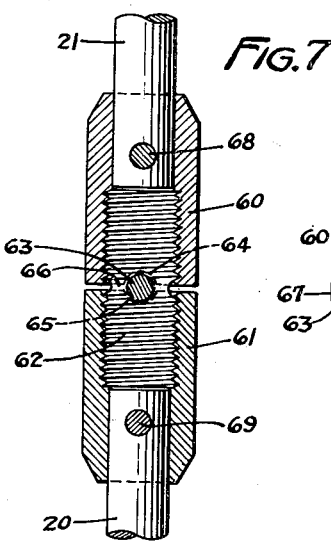
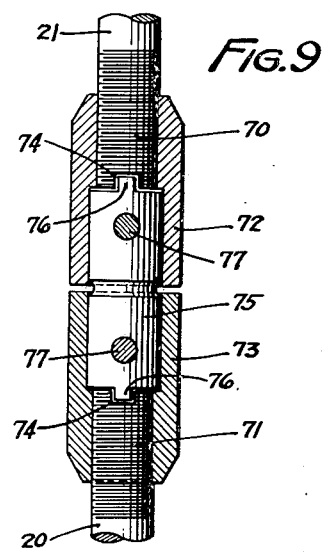
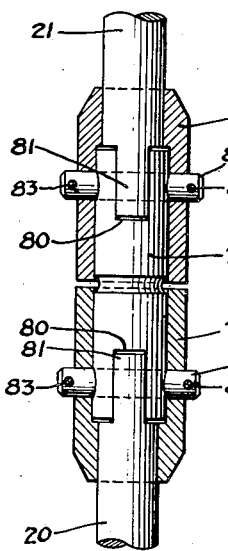
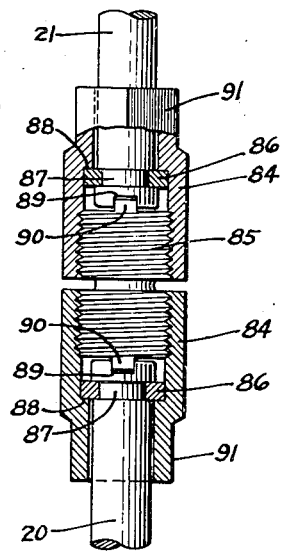
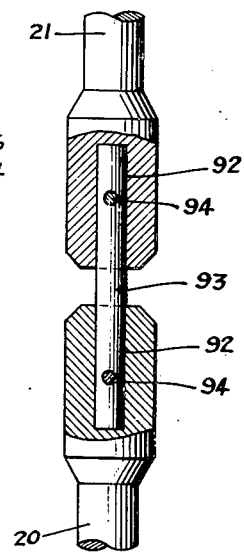
Inventor
RALPH R. BOYLES
By Paul, Paul & Moore
ATTORNEYS Patented June 29, 1937

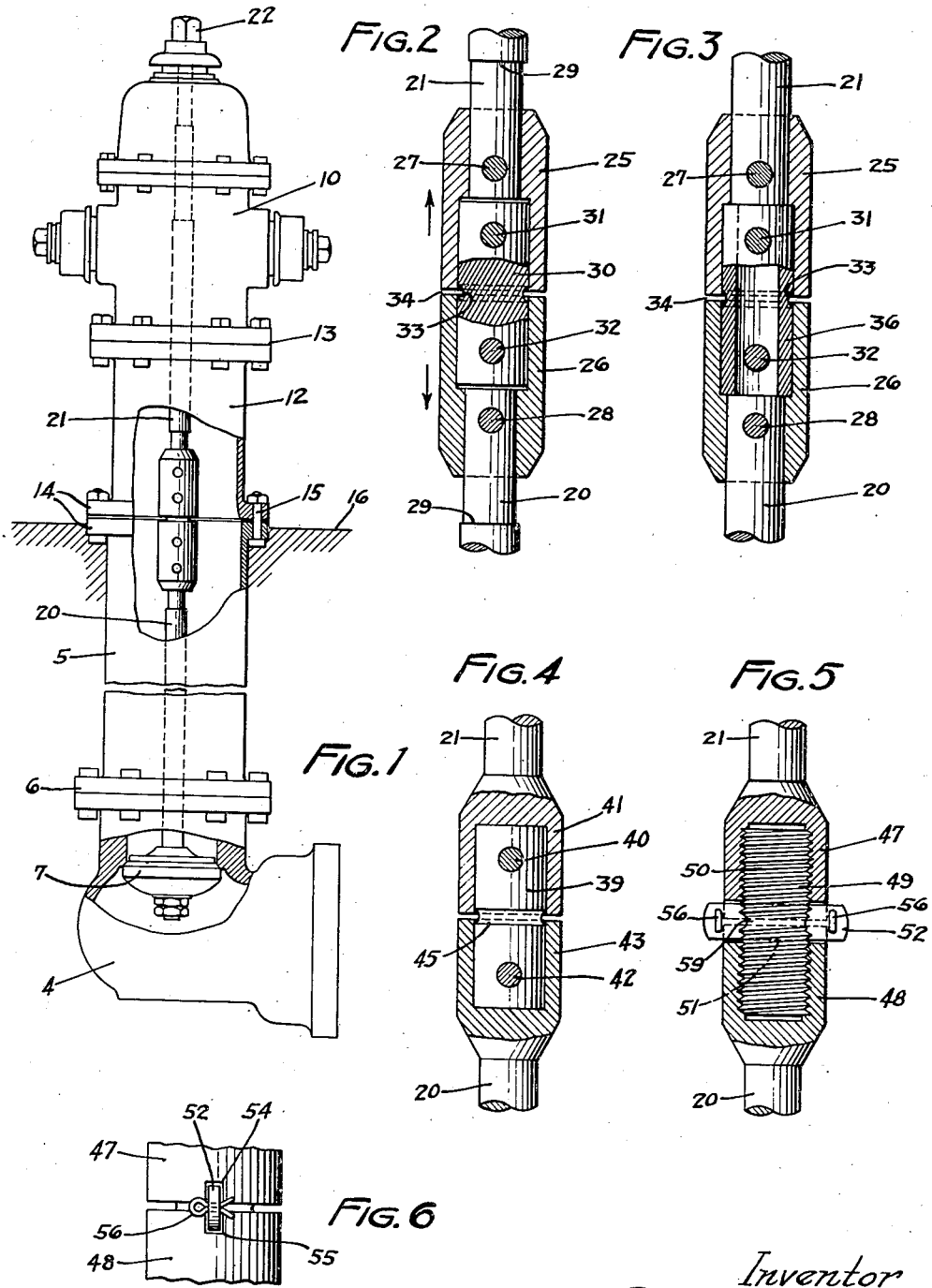

2,085,074

UNITED STATES PATENT OFFICE 2,085,074

HYDRANT AND DEFORMABLE OR BREAKABLE VALVE STEM THEREFOR

Ralph R. Boyles, St. Paul, Minn., assignor to Waterous Company, St. Paul, Minn., a corporation of Minnesota Application May 13, 1935, Serial No. 21,201

7 Claims. (Cl. 287—108)

My invention relates to improvements in hydrants and valve stems therefor, the stem structure being well adapted for use with fire hydrants. Such hydrants are frequently disposed at or near the curbing of a sidewalk and at or near the corners of streets or alleys in a position to be struck and broken by a motor vehicle. It is an object of this invention to provide structures which, when broken, can be quickly and cheaply replaced, while the valve remains seated.

One part of the hydrant which is broken is the valve stem, and it is a special object of this invention to provide an improved valve stem having two valve stem elements connected by a weakened portion which will break or bend (to prevent breakage or bending of the valve stem elements) when the stem is forced laterally with reference to its long axis, but to provide a connector means which can be easily and quickly and cheaply replaced after such breakage.

Features of the invention include: the combination of the specific breakable standpipe section on a breakable valve stem; the provision of a breakable section which forms a connector between two valve stem-forming elements; the use of pins as means for operatively connecting the connector to the stem elements; the use of a solid or hollow breakable connector; the use of a bendable non-breakable connector; the use of sleeves to form sockets for receiving the connector; the use of a threaded connection for securing the connector in the sockets; means for preventing relative rotation of the connected parts of the stem; and all details of construction shown.

Objects, features and advantages of the invention will be set forth in the description of the drawings forming a part of this application, and in said drawings Figure 1 is an elevation partly in section illustrating my improved fire hydrant;

Figure 2 is a longitudinal sectional elevation of one form of valve stem structure, in which the sockets are formed by sleeves and in which the frangible connector is solid;

Figure 3 is a view similar to Figure 2, showing a hollow connector;

Figure 4 is a view showing integral sockets and the solid connector;

Figures 5 and 6 are respectively a longitudinal section, and a fragmentary side view of a modification showing integral sockets, with the connector threaded into the sockets, along with means for preventing relative rotation of the parts;

Figures 7 and 8 illustrate a modification in which sleeves form the sockets and in which the connector is threaded into the sleeves, along with means for preventing relative rotation of the parts;

Figure 9 illustrates a modification in which sleeves are used to form the sockets, and in which they are connected to the rods by threads;

Figure 10 illustrates a modification in which sleeves are used and in which the connection between each sleeve, the corresponding stem element and the connector is made by a single pin;

Figure 11 is a view of a modification in which sleeves are used, and in which the sleeves are rotatably connected with the stem elements; and Figure 12 illustrates a modification, using a bendable non-frangible connector.

In Figure 1 is shown a fire hydrant having a shoe 4. The standpipe is shown at 5 and is suitably connected to the shoe or base as by flanges and bolts generally indicated at 6. The valve is indicated at 7. The nozzle housing or bonnet is generally indicated at 10 and the bonnet is connected to the standpipe by an intermediate section 12, said section being connected to the bonnet by means of flanges and bolts generally indicated at 13, and being connected to the standpipe by flanges 14, through which pass bolts 15 made of bronze or other material which will break, without injury to the flanges or connecting section 12, when sufficient force is applied to the bonnet, as by a colliding automobile. Each bolt is preferably provided with a weakening groove. The ground line is indicated at 16.

My improved valve stem structure comprises two stem elements, a lower stem element 20 which is suitably connected to the valve 7 and an upper stem element 21 connected to and operated by a nut 22 at the top of the hydrant.

Each stem element is provided with a terminal socket which may be formed in various ways. In Figure 2, each socket is formed by a sleeve, the sleeves being respectively indicated at 25—26. In this instance, the sleeve 25 is secured to the rod 21 by a cross pin 27 and the sleeve 26 is secured to rod 22 by pin 28. The numeral 30 generally indicates a frangible or deformable element as a connector sufficiently strong for transmitting valve-operating power, and having portions operably fitting within the sockets formed by the sleeves. This element may be solid or tubular, and may be adapted to break or bend. It is cheaply made, and when broken can be easily replaced at small cost.

Pin 31 holds one portion of this connector in the sleeve 25 and pin 32 holds the opposite portion in sleeve 26. The connector or plug is made of relatively brittle material, such, for example, as cast iron or bronze. It is preferably provided with a circumferential weakening groove 33 which lies centrally of its length and at the level of the ends of the sleeves which are slightly spaced as at 34. In addition to its weakening function, the groove serves to cause the break to take place at the desired place.

By this invention, when sufficient lateral strain is applied to the stem, the element 30 breaks instead of the rods, and replacement can be quickly and easily made by withdrawing pins 31—32, removing the separated portions of the connector 30, and introducing a new connector into the sockets and reinserting the pins 31—32. In case erosion has caused the broken sections to stick in their sockets, removal is facilitated by also removing pins 27—28, and sliding the sleeves in the direction of the arrows, using a hammer if necessary. Shoulders 29 limit translative motion of the sleeves.

In Figure 3 is shown a modification in which the connector 36 is hollow. In other respects the construction is substantially the same as in Figure 2, and the letters of reference are the same. By making the connector hollow, the strength flexure or bending may be varied by changing the bore and groove diameters, and this is a valuable feature.

In Figure 4, the sockets are formed integrally with the stem elements 20—21, that is no sleeves are used. In this instance, only two pins are used for securing the connector 39. Pin 40 secures the frangible connector in socket 41 and pin 42 secures the other portion of the connector in socket 43. The connector is shown of solid form like that of Figure 2 and is circumferentially grooved as at 45.

In Figures 5 and 6 is shown another modification in which the sockets 47—48 are integral with the respective stem elements, and in which the connector is operably secured by threaded means generally indicated at 50, the sockets being interiorly threaded. In order to prevent relative rotation between elements 20 and 21, that is to prevent unscrewing of the threaded connection, the connector 49 is provided with a diametric slot indicated in dotted lines at 51, and through this slot is passed a flat key or pin 52. The pin is engaged with diametrically arranged slots of the sockets, the slot for the socket 47 being indicated at 54 and the slot for the socket 48 being indicated at 55. Split keys 56 are passed through the projecting ends of the key as shown to prevent translation. The connector is provided with a break-level-defining groove 59. After breakage, the pin 52 may be used as a key for unscrewing the broken ends of the connector.

In Figures 7 and 8, another modification is shown in which the terminal sockets for the stem elements are formed by sleeves 60—61, and in which a threaded connector indicated at 62 is used. The connector is held against disengaging rotation by a pin indicated at 63, traversing slots at 64—65. The break-groove is indicated at 66, and the split keys at 67. In this case, the pin is round instead of flat as in Figures 5 and 6. The sleeves 60 are held by pins 68—69.

In Figure 9, sleeves are used to form the sockets, but instead of using pins to secure the sleeves to the rod, the rods are threaded as at 70—71 into the sleeves 72—73. The inner end of each stem element has a slot indicated at 74 and each end of the connector 75 has a diametric rib 76 entering the diametric slot. In this way, relative rotations of the parts are prevented. Portions of the connector 75 are secured in respective sockets by pins 77 and the connector has a central break groove as in the other forms. In this case, as in the other forms, where sleeves are used, the sleeves can be translated to force the broken connector sections out. This is accomplished, after the pins 75—77 are removed, by rotating the sleeve.

In Figure 10 is shown a form in which sleeves 78 are used, and the end of each opposite portion of the connector 79 has a deep diametric slot 80 therein. The end of each stem element has a corresponding diametric extension 81 fitted in the slot 80 as shown. A pin 82 passes through the sleeve, connector, and stem element as shown, to operatively secure the parts, and each pin is held by suitable keys 83. In this case only two pins are needed.

In Figure 11, sleeves 84 are used as socket-forming elements. The breakable connector 85 has a threaded engagement with the sleeves, and each sleeve is connected to the corresponding stem element by a split ring 86 engaging a groove 87 of the stem element. The split ring engages against a shoulder 88 of the sleeve, as shown. The end of each stem element is diametrically slotted as at 89 and each end of the frangible connector has a diametric rib 90 operatively engaging in the diametric slot 89. Each sleeve has wrench faces 91. By rotating the sleeve while the stem element is held against rotation, the threaded portion of the broken connector is disengaged.

Figure 12 shows a form in which the ends of the stem elements are enlarged and each enlargement is provided with an axial bore 92 which receives a portion of the connector 93. In this case, the connector is made of bendable material rather than a breakable material, and is either made of such material as can be rebent to its original position after deformation, or of material which must be replaced after deformation. It is a considerable advantage in having the material so that it can be bent and re-straightened a number of times, thus making disassembling and assembling of an element 93 unnecessary. The element 93, of course, is held by suitable pins 94. This is a valuable form of the invention inasmuch as the connection may be of the character which does not require replacement but which can merely be bent back into its original position.

This invention provides a very cheap and efficient breakable valve stem structure, the breakable part of which is easily and quickly replaced at a minimum cost.

Various means are provided for facilitating removal of the broken ends of the connector, when they have become eroded and stuck.

I claim as my invention:

1. A valve stem or the like comprising two stem elements each having a terminal socket, a frangible element as a connector having portions operably fitting said sockets, and means detachably operably securing each portion of said connector element in a corresponding socket, and comprising threaded connections, and means for preventing relative rotation of said elements, and comprising depressions in the ends of said stem elements and a cross pin traversing said connector and operably engaged with said depressions.

2. A valve stem or the like comprising two stem elements each having a sleeve forming a terminal socket, a frangible element as a connector having portions operably fitting in the sockets formed by said sleeves, slot and rib means non-rotatably but releasably connecting the end of each rod with the connector, and a pin for each sleeve passing through the corresponding sleeve, connector and corresponding rod, to secure the parts in operative relation.

3. A valve stem or the like comprising two stem elements each having a sleeve thereon forming therewith a terminal socket, a pin detachably securing each sleeve to its stem, a frangible connector having portions operably fitting said sleeve-formed sockets, and a pin detachably securing each portion of said connector to its corresponding sleeve, said sleeves and stems and connector being relatively slidable when the pins are removed.

4. A valve stem or the like comprising two stem elements, a sleeve for each element forming therewith a terminal socket, a frangible connector having portions fitting the sockets, plural means detachably securing the connector to the sleeves and means so connecting each sleeve to its stem element, that a relative motion between sleeve and stem can be had whereby to facilitate the removal of ends of the connector from the sockets after breakage of the connector and after release of the connector securing means.

5. A valve stem or the like comprising two stem elements, a sleeve for each element forming therewith a terminal socket, a frangible connector having portions fitting the sockets, plural means detachably securing the connector to the sleeves and the stems to the sleeves, each sleeve being slidable on the stem after release of the plural means, whereby to force the ends of the connector out of the sockets after breakage of the connector.

6. A stem assembly adapted for operating a valve comprising, two stem elements each having a terminal socket, a connector having portions in threaded engagement with corresponding sockets and means provided by the stem elements and in part by the connector for preventing relative rotation between the same.

7. A stem assembly adapted for operating a valve, comprising two stem elements each having detachably secured thereto a sleeve forming therewith a terminal socket, a connector having portions in threaded engagement with corresponding sockets, and means in part provided by the connector and in part by the stem elements for preventing relative rotation between the same.

RALPH R. BOYLES.